Oct. 10, 1967  J. J. TURNEY ETAL  3,346,485
PREVENTION OF DETERIORATION OF FERROUS CONTAINERS
BY MOLECULAR SIEVE DISPLACING AGENT
Filed Oct. 1, 1964
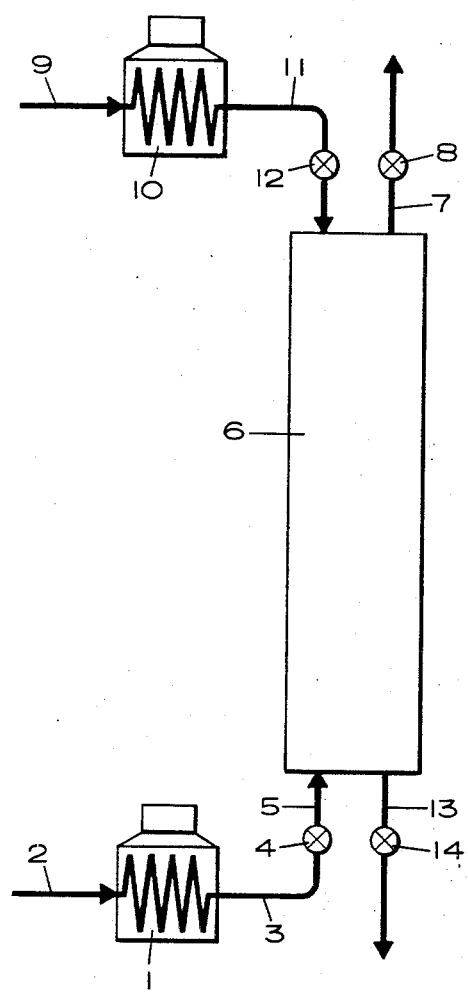
JOHN J. TURNEY
BRIAN E. HOPKINSON                INVENTORS
BY *Perry Carvellas*
PATENT ATTORNEY

United States Patent Office 3,346,485
Patented Oct. 10, 1967

3,346,485
PREVENTION OF DETERIORATION OF FERROUS CONTAINERS BY MOLECULAR SIEVE DISPLACING AGENT
John J. Turney, Chester, and Brian E. Hopkinson, Summit, N.J., assignors to Esso Research and Engineering Company, a corporation of Delaware
Filed Oct. 1, 1964, Ser. No. 400,818
12 Claims. (Cl. 208—310)

This invention is basically concerned with a method of preventing the dissociation of ammonia and primary, secondary and tertiary amines. More particularly, this invention concerns the prevention of the dissociation of ammonia and amines when these materials are contacting a metallic surface. The metallic surface may be any ferrous alloy but in its most particular form, the invention concerns the dissociation of ammonia and amines while contacting carbon steel, or Incoloy alloy 800. Carbon steel is well-known as a tough, elastic alloy of iron containing small quantities of carbon. Mild or soft steel will contain less than 0.15% carbon, medium steel will contain 0.15 to 0.30% carbon and hard steel will contain more than 0.30% carbon. Other materials found in carbon steels include manganese, phosphorus and sulfur. Carbon steel is well-known in the art and no further discussion is in order since one skilled in the art would be well familiar with it. Incoloy alloy 800 contains about 32% nickel, 21% chrome and 44% iron. These percentages are approximate and may vary somewhat.

All of the metals previously mentioned have a tendency to catalyze the high temperature dissociation of ammonia and amines and are nitrided. According to this invention, it has unexpectedly been discovered that by coating any of the above-mentioned metals with aluminum, the problems of dissociation and nitriding are solved. The dissociation and nitriding are particularly prevalent at higher temperatures, i.e., temperatures of 600° to 1250° F. The problem is even more acute in the range of 850° to 1200° F. Thus, even the most severe dissociation and nitriding, i.e., at temperatures of 850° to 1200° F., will be prevented by coating the ferrous alloy, which may be carbon steel, with aluminum. The problem solved by such a discovery is vast and no purpose would be served by discussing all of its ramifications. In the interest of clarity, the invention will be discussed in the setting of a molecular sieve separation process. However, it is readily apparent to one skilled in the art that a discovery of such wide scope may be used in a large variety of areas, i.e., ammonia converters. However, it would appear that a discussion relevant to molecular sieve separation would best illustrate the principal of the instant invention.

Thus, in its more specific form, the present invention is concerned with a method of improving the overall efficiency of a molecular sieve separation process. Still more particularly, the present invention relates to an improved process for the efficient and economical separation and segregation of straight chain or aromatic hydrocarbons from mixtures comprising straight chain hydrocarbons, branched hydrocarbons, naphthenes and aromatics. In still more specific terms, this invention would relate to a process in which select hydrocarbons are adsorbed from a mixture onto a molecular sieve and then are displaced from the molecular sieve by means of a displacing or desorption agent, such agent being ammonia or a primary, secondary or tertiary amine.

This invention may also be used to aid in the efficiency of the separation of olefins, aromatics and sulfur compounds from a light naphtha feed stream by means of a molecular sieve. This type of separation is more completely described in U.S. Patent No. 3,098,814 and this patent is hereby incorporated by reference. A further use for this invention would be in the separation of aromatics and/or nonhydrocarbons from saturated hydrocarbons and/or olefins and the separation of olefins from saturated hydrocarbons. Additionally, this invention may be used in the separation of linear components such as normal paraffins from hydrocarbons, particularly petroleum hydrocarbons. A further use for this invention may be found in the removal of aromatics from an olefin stream by means of a Type X sieve. Other varied uses for this invention will be obvious to one skilled in the art and need not be enumerated at this time. However, it should be noted that this invention may be utilized with all molecular sieves, including Type A and Type X molecular sieves, as well as Type Y molecular sieves.

It has been known for some time that certain zeolites, both naturally occurring and synthetic, have the property of separating normal from isomeric branched chain hydrocarbons, as well as from cyclic and aromatic admixtures. Zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of a molecule for the adsorbent must be present. The pores may vary in diameter from 3 to 6 A. units to 8 to 15 A. units or more, but it is a property of these zeolites or molecular sieves that for particular sieves, the pores are of substantially uniform size. The adsorbents with pore sizes of 8 to 15 A. units have a high selectivity for aromatics and nonhydrocarbons. This is due to the polar nature of aromatics and the resulting interaction with the sieve surface. Thus, such adsorbents can be used to separate aromatics and nonhydrocarbons from saturates.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. Patent No. 2,442,191. An example of a class of synthetic zeolites which is used to separate normal hydrocarbons from branched hydrocarbons is Type A sieve with divalent cations from the alkaline earth sieves, particularly, calcium Type A. These adsorbents are described in U.S. Patent No. 2,882,243. An example of a class of adsorbents which is used to separate aromatics from saturates is Type X sieves with monovalent and divalent cations from the alkaline and alkaline earth sieves, particularly, sodium and calcium Type X. These adsorbents are described in U.S. Patent No. 2,882,244. Zeolites vary somewhat in composition, but generally contain silica, aluminum, oxygen and an alkali and/or alkaline earth element, e.g., sodium and/or calcium, magnesium, etc. A large number of naturally occurring zeolites have molecular sieve activity, i.e., the ability to adsorb straight chain hydrocarbon and exclude the branched chain isomers. They are described in an article, "Molecular Siev Action of Solids," appearing in Quarterly Reviews, pages 293 to 330 (1949), and published by the Chemical Society (London).

The separation of normal from branched chain or aromatic hydrocarbons or mixtures, either for the purpose of enriching the mixture in branched chain, cyclic or aromatic components, or for isolating and recovering of the normal isomer has become increasingly important to industry. Thus, in the preparation of jet and diesel fuels, the presence of normal paraffins degrades the freezing point rating. On the other hand, in the manufacture of synthetic detergents, such as alkyl-aryl sulfonates, a straight chain alkyl substitutent makes for better detergency and biodegradable characteristics than a branched chain substituent of the same number of carbon atoms. In a typical separation process concerning the separation of straight chain paraffins and other nonhydrocarbons and nonstraight chain hydrocarbons which would include paraffins by means of a Type A sieve, the feed stock is passed over a Type A sieve at a temperature of approximately 400° to 800° F., preferably 500° to 750° F. The pressure will be 1 to 500 p.s.i.a. and the amount of feed per cycle will be 0.01 to 10 w./w., preferably 0.02 to 5 w./w. Normal paraffins are adsorbed onto the sieve bed with the remainder of the feed passing out of the other end of the bed as effluent. After a desired amount of time, a displacing agent is passed through the said bed in order to remove the armomatics which have previously been adsorbed.

A displacing agent is defined as a polar or polarizable material having an appreciable affinity for the sieve compared with a material desired to be desorbed and which will generally have a heat of adsorption approximately equal to the material that it is desired to desorb. Displacing agents are preferably used in the gaseous state. Displacing agents are also referred to as desorbents, displacing mediums and desorbing mediums. The preferred displacing agent has the general formula:

wherein $R_1$, $R_2$ and $R_3$ are selected from the group consisting of hydrogen and $C_1$ to $C_5$ alkyl radicals. Ammonia is the especially preferred displacing medium with the $C_1$ to $C_5$ primary amines being next in order of preference to ammonia, and the $C_1$ to $C_{15}$ primary, secondary and tertiary amines, next in that order of preference. Desirably, the desorption temperature is approximately equal to the temperautre of adsorption, 400° to 800° F., preferably 500° to 750° F., and it would in its most preferred case, be 675° F. This process has worked exceedingly well in the past. However, it has presented problems which have resulted in its operating at less than maximum efficiency. When operating within temperature ranges of 600° to 1250° F. and especially 850° to 1200° F., significant ammonia dissociation has been seen to take place. In addition to this, a considerable amount of nitriding has occurred.

In order to heat the displacing agent, which is ammonia or a primary, secondary or tertiary amine as defined above to a temperature of about 675° F., considerably higher wall temperatures in the furnace which is utilized for heating must be attained. Thus, the wall temperatures of the furnace are in the vicinity of 850° to 1200° F. As mentioned previously, this results in a considerable amount of ammonia and amine dissociation as well as nitriding. Thus, the problem is most acute in the ammonia furnace and the aluminization of this furnace, in keeping with the instant invention, is essential to obtaining efficient operation of the system. The wost dissociation is found in the case of the ammonia which is adjacent to the walls of the furnace since the heat is greatest at this point.

It should be noted that instead of a furnace, a vessel may be used along with a direct heating system. Heat would be supplied by blowing a hot gas through the vessel.

Basically, nitriding is the reaction of nascent nitrogen, which is produced when ammonia dissociates according to the following formula, $$NH_3 \rightarrow N° + 3/2 H_2$$

with the metallic elements in the materials of construction. It has been found that this reaction occurs with particular readiness in the presence of carbon steel as well as several different types of stainless steels and to a lesser extent with the high nickel alloys. Other amines which have been set forth earlier face a similar dissociation problem.

Ammonia and amine dissociation with the resulting nitriding present a great number of problems with respect to a molecular sieve separation process. Dissociation, as would be apparent, consumes part of the process ammonia or amine which is utilized as a displacing agent and may generate considerable noncondensable hydrogen and nitrogen. The presence of this hydrogen and nitrogen would naturally serve to reduce the displacing capacity of any molecular sieve separation process which, as in the instant case, utilized ammonia or amines as a displacing agent since the desorpiton of the adsorbed hydrocarbon is a function of the number of pounds of ammonia or primary, secondary or tertiary amine which is put through the sieve. Making up this displacing agent to offset the dissociation loss would greatly increase the cost of plant operations. In addition, the generation of the noncondensables requires the inclusion of costly purge facilities and would greatly increase the process gas compressor size and power requirements.

Further, the nitriding which would occur serves to embrittle the materials of construction and presents a potential plugging problem in the sieve beds due to spalling of the nitrided layer. Additionally, nitriding and dissociation greatly restrict the allowable temperature differential that can be used in the design of the ammonia heater furnace. The latter consideration results in a larger, more expensive furnace and would increase the compressor requirements still further.

According to this invention, these problems, that is to say, the problems caused by ammonia and amine dissociation and nitriding are virtually eliminated. It has unexpectedly been discovered as mentioned earlier that by utilizing a hot dipped aluminum coating on all carbon steel which contacts the ammonia and, in particular, the sieve casing which houses the molecular sieve and the furnace used to heat the ammonia, the dissociation of the ammonia may be eliminated. Thus, the problems of nitriding and ammonia dissociation, as indicated above, are no longer present within the temperature range utilized. The aluminum coating provides a noncatalytic surface which mitigates dissociation. Aluminum coatings can be applied in several ways such as vacuum metallizing, hot dipping, diffusion, spraying or electrophoresis, depending on the end application. In this instance, the aluminum coating was applied by the hot dipping (aluminizing) method. However, there is reason to believe that applying the coating by the diffusion process (calorizing) would be equally satisfactory.

In the hot dipping process, the aluminum coating is applied by dipping a sandblasted, preheated metal member or part into a molten bath of aluminum maintained at about 1700° F. The part is held submerged in the bath for a period of time, depending on the composition of the alloy to be coated, to permit some diffusion of the aluminum into the surface to occur. The time period varies from about 5 to 30 minutes. The part is then removed and cooled. The end result is a metal composite consisting of 4 to 5 mils of pure aluminum on the surface. Beneath this surface there will be a 4 to 5 mil layer composed of an aluminum-iron complex, as a result of the aluminum diffusion into the base material. Finally, below this layer there will be the original base material. The depth of the aluminum layer on top of the metallic surface is not critical. However, sufficient aluminum must be applied to completely cover the surface and thereby prevent the catalytic surface from contacting the ammonia or amine. Aluminum coatings of 2 to 8 mils have been found to be satisfactory. Better results are obtained with a layer of aluminum which is 3 to 6 mils in depth.

The attached drawing is a schematic representation of how the instant invention may be applied to a molecular sieve process.

In a conventional process, feed is fed into furnace 1 through line 2. Within the furnace it is raised to a temperature of from 400° to 800° F. The heated feed is then removed from the furnace through line 3, passes through valve 4 and into line 5. In the case of the instant invention, furnace 1 and lines 2, 3 and 5 are all lined with aluminum. This is optional since they do not usually come in contact with displacing agent but no harm is done in doing this. It may be added that it is not crucial to the invention, for as mentioned previously, these parts do not usually come in contact with displacing agent. It may be desirable, however, to add ammonia or amine with the feed, in which case, the aluminization of these parts would be critical. From line 5, the heated feed passes into sieve bed 6. The casing and internal components of said bed 6 are aluminized. Within the said bed may be any of the Type X, Type Y or Type A sieves which are sold commercially. In the instant case, the sieve bed contains Type 5A sieves and normal paraffins are adsorbed thereon. The effluent consisting of isomers of the paraffins which were not adsorbed as well as olefins, aromatics and nonhydrocarbons pass out of the bed through line 7 and valve 8. Since line 7 and valve 8 come in contact with displacing agent, they should be aluminized. After the adsorption, displacing agent which, in its most preferred form, is ammonia, is passed through line 9 and into heater 10. It is critical to the invention that the tubes in heater 10 be internally aluminized. Within the heater 10, ammonia is heated to a temperature of 400° to 800° F. To achieve temperatures which are this high, the tubes in the heater must be heated to a temperature of 1000° to 1100° F. At temperatures of over 600° F., ammonia and amines dissociate. Ammonia is then removed from heater 10 through aluminized line 11, passes through aluminized valve 12 and from there into aluminized sieve bed 6. The ammonia, or other displacing agent, serves to displace the normal paraffins which are adsorbed. These normal paraffins pass out through aluminized line 13 and valve 14. It is essential to this invention that line 13 and valve 14 be aluminized since they are certain to come in contact with a desorbing agent such as ammonia. The cycle of desorption and adsorption is continued until the capacity of the sieve falls below a certain desired level, say 75% capacity. Then, at the last desorption phase of a cycle, a new cycle commencing with adsorption is not attempted.

The invention is further illustrated by the following example.

*Example*

The following table indicates the results of a comparison between several metals with respect to the ammonia dissociation which takes place at elevated temperatures. The various metals were formed into a straight tube furnace and ammonia was then introduced into the furnace at varying tube metal temperatures. The resulting dissociation of ammonia was measured. This dissociation was measured by the nitrogen content of effluent ammonia in parts per million which were recovered from the furnace. The measurement was made by means of gas chromatography. A mass spectrometer could also be utilized. The amount of nitrogen present indicated the extent of the ammonia dissociation.

From the following table, it is readily apparent that the aluminizing of carbon steel has a marked effect on the amount of ammonia dissociation which takes place over it. At a temperature of 1100° F., nonaluminized carbon steel caused a nitrogen content of 2995 p.p.m. Aluminized carbon steel tube, which was exposed to the same temperature, 1100° F., for a period of less than 24 hours, had a nitrogen content of 33 p.p.m. After a period of 58 days of exposure to ammonia at 1000° F., the aluminized carbon steel tube only produced 65 p.p.m. of nitrogen at 1100° F. This indicates a clear, substantial improvement when aluminized tubing was utilized.

TABLE.—DISSOCIATION OF AMMONIA IN STRAIGHT TUBE FURNACE

| Tube Material | Time of Exposure to Hot Ammonia Before Measurement Made | Temperature of Exposure, °F. | Tube Metal Temperature During Measurement of Dissociation, °F. | Nitrogen Content of Effluent Ammonia, p.p.m.[1] |
| --- | --- | --- | --- | --- |
| Carbon Steel | <24 hrs | 700–1,100 | 700 | <5 |
|  |  |  | 800 | <5 |
|  |  |  | 900 | 15 |
|  |  |  | 1,000 | 163 |
|  |  |  | 1,100 | 2,995 |
| Incoloy 800 | <24 hrs | 700–1,100 | 700 | <5 |
|  |  |  | 800 | <5 |
|  |  |  | 900 | 14 |
|  |  |  | 1,000 | 40 |
|  |  |  | 1,100 | 1,600 |
| Aluminized Carbon Steel Tube | <24 hrs | 700–1,100 | 700 | <5 |
|  |  |  | 800 | <5 |
|  |  |  | 900 | <5 |
|  |  |  | 1,000 | <5 |
|  |  |  | 1,100 | 33 |
| Do | 29 days | [3] 1,000 | 700 | <5 |
|  |  |  | 800 | <5 |
|  |  |  | 900 | 5 |
|  |  |  | 1,000 | 19 |
|  |  |  | 1,000 | [2] 10 |
| Do | 58 days | [3] 1,000 | 700 | <5 |
|  |  |  | 800 | <5 |
|  |  |  | 900 | 10 |
|  |  |  | 1,000 | 19 |
|  |  |  | 1,100 | 65 |
|  |  |  | 1,000 | [2] 8 |

[1] Flow rate of ammonia was 0.58 s.c.f.m. The pressure utilized was 14.7 p.s.i.a. for all cases.
[2] Flow rate increased to 1.06 s.c.f.m.
[3] Other than when dissociation measured.

What is claimed is:

1. In a molecular sieve separation process wherein normal paraffins are adsorbed on a molecular sieve bed in a molecular sieve zone and displaced with a heated displacing agent having the general formula,

wherein $R_1$, $R_2$ and $R_3$ are selected from the group consisting of hydrogen and $C_1$ to $C_5$ alkyl radicals, the improvement which comprises heating the said displacing agent in a ferrous alloy comprising furnace said furnace containing a lining consisting of aluminum prior to passing the said displacing agent into the said molecular sieve zone.

2. The process of claim 1 wherein the said normal paraffin is adsorbed onto a 5A molecular sieve.

3. The process of claim 1 wherein the said displacing agent is heated to a temperature of 400° to 800° F. and the wall temperature of the said furnace is between 600° and 1200° F.

4. The process of claim 1 wherein the said displacing agent is ammonia.

5. A molecular sieve separation process which comprises passing a hydrocarbon feed stock into a molecular sieve separation zone, said separation zone being aluminum coated, absorbing at least a portion of said hydrocarbon on said molecular sieve, heating a displacing agent, the said displacing agent having the general formula,

wherein $R_1$, $R_2$ and $R_3$ are selected from the group consisting of hydrogen and $C_1$ to $C_5$ alkyl radicals in ferrous alloy comprising furnace said furnace containing a lining consisting of aluminum, passing the said heated displacing agent into the said molecular sieve zone whereby the said adsorbed hydrocarbon is displaced and recovered.

6. The process of claim 5 wherein the said displacing agent is heated to a temperature of 400° to 800° F. and the said wall temperature of the furnace is from 600° to 1200° F.

7. The process of claim 5 wherein the said adsorbable hydrocarbon is a normal paraffin and the said molecular sieve is a 5A molecular sieve.

8. The process of claim 5 wherein the said molecular sieve is a Type X sieve and the said adsorbable hydrocarbon is an aromatic hydrocarbon.

9. An improved molecular sieve separation process wherein a hydrocarbon feed, at least a portion of which is adsorbable onto a zeolitic molecular sieve, is passed over a zeolitic adsorbent, the said adsorbent being encased in a ferrous alloy casing zone whereby the said adsorbable portion is adsorbed on said sieve and is then displaced with a heated displacing agent, said displacing agent having the general formula,

wherein $R_1$, $R_2$ and $R_3$ are selected from the group consisting of hydrogen and $C_1$ to $C_5$ normal alkyl radicals, the improvement which comprises coating the said sieve casing with a lining consisting of aluminum prior to the introduction of feed whereby dissociation of displacing agent and nitriding are substantially eliminated.

10. The process of claim 9 wherein the said displacing agent is ammonia.

11. The process of claim 9 wherein said molecular sieve is selected from the group consisting of Type A, Type X and Type Y molecular sieves.

12. An improved molecular sieve separation process which comprises passing a hydrocarbon feed stock into a molecular sieve containing ferrous alloy separation zone which is coated with a coating consisting of aluminum, at least a portion of said hydrocarbon being adsorbable on said molecular sieve and the remainder of said feed stock passing out of said zone as effluent, desorbing said adsorbed hydrocarbon with a polar or polarizable displacing agent, the said displacing agent having the general formula,

wherein $R_1$, $R_2$ and $R_3$ are selected from the group consisting of hydrogen and $C_1$ to $C_5$ alkyl radicals.

References Cited

UNITED STATES PATENTS

| 1,815,428 | 7/1931 | Black | 23—252 |
|---|---|---|---|
| 1,835,426 | 12/1931 | Pier | 208—112 |
| 1,872,011 | 8/1932 | Russell | 208—107 |
| 1,884,880 | 10/1932 | Saunders | 23—252 |
| 1,894,116 | 1/1933 | Pier | 23—252 |
| 1,939,162 | 12/1933 | Caro et al. | 23—252 |
| 1,949,109 | 2/1934 | Pier et al. | 23—252 |
| 1,969,422 | 8/1934 | Pier | 23—252 |
| 2,017,428 | 10/1935 | Almquist | 23—239 |
| 3,271,303 | 9/1966 | Epperly et al. | 208—310 |

FOREIGN PATENTS 366,762  2/1932  Great Britain.

DELBERT E. GANTZ, *Primary Examiner.*

ALPHONSO D. SULLIVAN, H. LEVINE, *Examiners.*